No. 665,373. Patented Jan. 1, 1901.
F. C. SOMMERS.
COMPOUND DISTRIBUTING ATTACHMENT FOR PLOWS.
(Application filed Apr. 19, 1900.)
(No Model.)
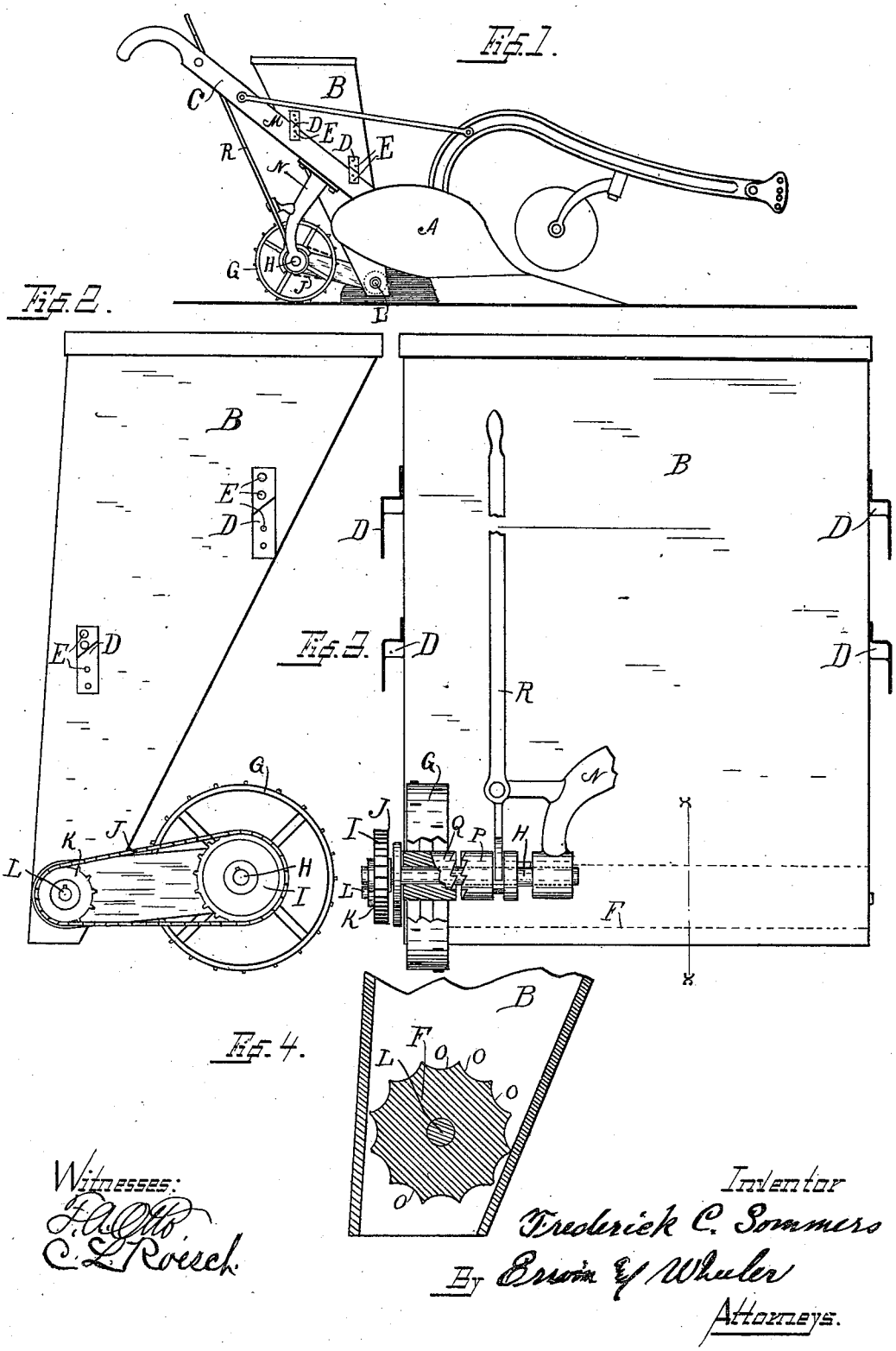
Witnesses:
F. A. Otto
C. L. Roesch
Inventor
Frederick C. Sommers
By Erwin & Wheeler
Attorneys.
THE NORRIS PETERS CO., PHOTO-LITHO., WASHINGTON, D. C.

UNITED STATES PATENT OFFICE.

FREDRICK C. SOMMERS, OF SUSSEX, WISCONSIN, ASSIGNOR OF ONE-HALF TO HENRY G. RUENZEL, OF MILWAUKEE, WISCONSIN.

COMPOUND-DISTRIBUTING ATTACHMENT FOR PLOWS.

SPECIFICATION forming part of Letters Patent No. 665,373, dated January 1, 1901.

Application filed April 19, 1900. Serial No. 13,473. (No model.)

*To all whom it may concern:*

Be it known that I, FREDRICK C. SOMMERS, a citizen of the United States, residing at Sussex, county of Waukesha, and State of Wisconsin, have invented new and useful Improvements in Compound-Distributing Attachments for Plows, of which the following is a specification.

The object of my invention is to provide a device to be used in connection with an ordinary plow or similar agricultural implement, which device is adapted to automatically and uniformly distribute a weed-exterminating compound along the furrow or ground over which it passes at the will of the operator whenever required so to do for destroying Canada thistles and other noxious weeds.

The construction of my invention is explained by reference to the accompanying drawings, in which—

Figure 1 represents a side view thereof attached to the plow; Fig. 2, a receptacle for carrying the exterminating compound shown from the opposite side of that illustrated in Fig. 1, together with the distributing mechanism, the same being detached from the plow. Fig. 3 represents a rear view of a shifting gear-clutch for throwing the distributing mechanism in and out of gear with the driving-wheel of the distributer. Fig. 4 represents a cross-section of the distributing-roller drawn on line $x\,x$ of Fig. 3.

Like parts are identified by the same reference-letters throughout the several views.

A represents a plow of ordinary construction.

B is a receptacle for carrying the exterminating compound to be distributed. The receptacle B is supported from the handles C of the plow by the fastening-clamps D and screws E or by any other convenient means desired and may be detached from the plow when not required. The lower or discharge end of the receptacle B is provided with a distributing-roller F, which when at rest prevents the escape of the compound, but when rotated is adapted to distribute the compound uniformly upon the surface over which it passes. A rotary movement is communicated to the distributing-roller F from the driving-wheel G through the shaft H, sprocket-wheel I, sprocket-chain J, sprocket-wheel K, and roller-supporting shaft L. The driving-wheel is adapted to rest upon the ground and is caused to revolve by contact therewith as the plow is drawn forwardly. The driving-wheel G and mechanism connected therewith are detachably connected with the handles M of the plow by the bracket N or any suitable means.

The surface of the distributing-roller F is grooved or fluted, forming a succession of pockets O, each of which as the roller revolves conveys a small quantity of the compound from the receptacle and distributes the same uniformly over the roots and stems of the weeds that have been torn up by the plow. The surfaces of the roller between the grooves or pockets bear against the opposing walls of the receptacle and prevent the compound escaping past the roller when the same is at rest and in only such quantities as enter and are carried out by such pockets.

The distributing-roller is rigidly connected with the supporting-shaft L and turns with it.

Located on the shaft H is a clutch-collar P, which is keyed or feathered to said shaft H and turns with it, while it is free to be shifted in and out of contact with the clutch Q, formed on the hub of the driving-wheel G, by the movement of the shifting lever R, whereby it is obvious that motion may be communicated from the driving-wheel G, through the clutches Q and P, to the shaft H, when motion is communicated from thence to the sprocket-wheel I, chain J, wheel K, and shaft L to the distributing-roller, as previously described.

It will be understood that when the lever R is in the position shown the plow may be used without revolving the distributing-roller; but when desirous to actuate the distributing-roller it is simply necessary to throw the lever R toward the right, whereby the clutch P is brought into engagement with the clutch Q of the driving-wheel G and the feed-roller is caused to rotate as described.

Having thus described my invention, what I claim as new, and desire to secure by Letters Patent, is—

In a device for distributing weed-exterminating compound, the combination of a plow or similar agricultural implement; of a receptacle for carrying the compound; a distributing-roller carrying the compound from such receptacle, and distributing the same; a driving-wheel actuated by contact with the ground over which it is drawn; a shifting clutch feathered to and supported upon the same shaft with the driving-wheel, and having teeth registered with corresponding teeth upon the hub of said driving-wheel, with which they are adapted to engage; and a sprocket-chain and sprocket-wheels for communicating motion from the shaft of said driving-wheel to the shaft of said distributing-roller, all substantially as and for the purpose specified.

In testimony whereof I affix my signature in the presence of two witnesses.

FREDRICK C. SOMMERS.

Witnesses:
LEVERETT C. WHEELER,
EDWARD J. MCDONOUGH.